United States Patent
Zwicker et al.

(10) Patent No.: US 6,744,435 B2
(45) Date of Patent: Jun. 1, 2004

(54) RENDERING DISCRETE SAMPLE POINTS PROJECTED TO A SCREEN SPACE WITH A CONTINUOUS RESAMPLING FILTER

(75) Inventors: Matthias B. Zwicker, Gerlikon (CH); Hanspeter Pfister, Somerville, MA (US); Jeroen van Baar, Brighton, MA (US); Markus H. Gross, Uster (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 417 days.

(21) Appl. No.: 09/842,737

(22) Filed: Apr. 26, 2001

(65) Prior Publication Data

US 2003/0016218 A1 Jan. 23, 2003

(51) Int. Cl.$^7$ ............................................. G06T 17/00
(52) U.S. Cl. ...................... 345/424; 345/615; 345/616; 382/154; 382/260; 382/265
(58) Field of Search ................. 345/424, 615, 345/616; 382/260, 265, 154

(56) References Cited

U.S. PATENT DOCUMENTS 6,222,937 B1 * 4/2001 Cohen et al. ................ 382/154

OTHER PUBLICATIONS

Mueller et al., "Splatting Errors and Antialiasing"; IEEE Transactions on Visualization and Computer Graphics, vol. 4, No. 2, Apr.–Jun., 1998.

Paul S. Heckbert, "Fundamentals of Texture Mapping and Image Warping"; Master's Thesis, Dept. of Electrical Engineering and Computer Science, University of California, Berkeley, Jun. 17, 1989.

* cited by examiner

Primary Examiner—Adam Arnold
(74) Attorney, Agent, or Firm—Dirk Brinkman; Andrew Curtin

(57) ABSTRACT

A method produces an image from a set of discrete sample points. The sample points can define a 3D volume or surface. Each discrete sample point is projected to a screen space. A continuous resampling filter for each sample point is generated in screen space. The continuous resampling filter is a combination of a continuous reconstruction function and a continuous filter function for the sample point in screen space. The continuous resampling filter is then applied to each corresponding discrete sample in the screen space to generate a continuous sample for the image. The continuous samples can be rasterized to pixels using any known rasterization process or method.

18 Claims, 10 Drawing Sheets

RENDERING DISCRETE SAMPLE POINTS PROJECTED TO A SCREEN SPACE WITH A CONTINUOUS RESAMPLING FILTER

FIELD OF THE INVENTION

The present invention relates generally to computer graphics, and more particularly to rendering three-dimensional volume and point-sample data with splatting methods.

BACKGROUND OF THE INVENTION

Laser range and image-based scanning can produce complex and visually stunning three-dimensional (3D) images. However, scanning produces a huge number of point-samples. Hereinafter, a point-sample is defined as a zero-dimensional point in space having (x,y,z) coordinates. Typically, the point-samples do not have connectivity information. That is, the point-samples are not related or linked. This makes it difficult to render point-samples as images.

One common way to connect the point-samples is with polygon (triangle) meshes, and then to render the meshes. However, some meshes are too large to be rendered interactively, and many applications cannot tolerate the inherent loss in geometric accuracy and texture fidelity that comes from polygon reduction. Recent efforts have focused on direct rendering of unconnected point-samples. These techniques use hierarchical data structures and forward warping to render the point-samples efficiently.

One important challenge for point rendering is to properly reconstruct an image of a continuous surface from irregularly spaced point-samples. The image must be correct, and independent of the order in which the point-samples are rendered. Very often, the point-samples must appear as a continuous opaque or translucent surface while maintaining the high texture fidelity of the scanned data. In addition, point rendering should correctly handle hidden surface removal and transparency.

In the prior art, texture mapping is frequently used to "fill-in" the surface areas between the point-samples. Texture mapping increases the visual complexity of models by mapping functions for color, normals, or other material properties onto the model surfaces. If these texture functions are inappropriately band-limited, texture aliasing may occur during the projection to raster images. In addition, texture mapping is mostly used for surface rendering. Volume rendering is important for visualizing acquired and simulated data sets in scientific and engineering applications. Volume rendering reconstructs a 3D function from discrete sample points, transforms the 3D function into screen space, and then evaluates opacity integrals along line-of-sights, called "rays."

In interactive volume rendering, splatting approximate this procedure, see Westover "Interactive Volume Rendering," Upson, editor, *Proceedings of the Chapel Hill Workshop on Volume Visualization*, pages 9–16, University of North Carolina at Chapel Hill, Chapel Hill, N.C., May 1989. Westover does not deal with aliasing problems, which lead to noticeable artifacts such as jagged silhouette edges and Moiré patterns in textures.

With splatting, the volume data is interpreted as a field of 3D reconstruction kernels, one kernel for each particle, voxel, or discrete sample point. Each 3D reconstruction kernel absorbs and emits light. Integrals are predetermined separately across each 3D kernel, resulting in "footprint" functions. Each footprint function "spreads" the contribution of each point over nearby pixels in the image. Typically, the span of the footprint is in the order of two to five pixels. The "smeared" contributions of each discrete sample point of the 3D volume are composited, i.e., accumulated, in a front-to-back or back-to-front order to produce the pixels of the output image.

Prior art splatting suffers from inaccurate visibility determination when compositing the splats in the back-to-front order. This leads to visible artifacts such as color bleeding. This problem can be solved by using an axis-aligned sheet buffer, see Westover "Footprint Evaluation for Volume Rendering," *Computer Graphics*, Proceedings of SIGGRAPH 90, pages 367–376, 1990. However, that solution produces disturbing "popping" artifacts in animations.

Popping is the term used to describe discontinuous intensity changes between subsequent images in the animation sequence. The sheet buffer can also be aligned parallel to the image plane, see Mueller et al. "Eliminating Popping Artifacts in Sheet Buffer-Based Splatting," *IEEE Visualization '98*, pages 239–246, 1998. They also splat several slices of each 3D reconstruction kernel separately. Their technique is similar to slice-based volume rendering, and does not suffer from popping artifacts.

Splatting can be combined with ray casting techniques to accelerate rendering with perspective projection. Hierarchical splatting allows progressive refinement during rendering. Furthermore, splatting can also be applied on a volume data set represented as wavelets.

Aliasing artifacts may occur in areas of the volume where the sampling rate along diverging rays falls below the volume grid sampling rate. A distance-dependent function can "stretch" the footprints to make them act as low-pass filters, see Swan et al. "Anti-Aliasing Technique for Splatting," *Proceedings of the 1997 IEEE Visualization Conference*, pages 197–204, 1997. Swan adjusts the size of the footprints according to the distance between the samples and the image plane. Swan is distinguished in greater detail below.

Additional care has to be taken when the 3D reconstruction kernels are not radially symmetric, as is the case for rectilinear, curvilinear, or irregular grids. In addition, for an arbitrary position in 3D space, contributions from all kernels must sum up to one. Otherwise, artifacts such as splotches occur in the image. For rectilinear grids, elliptical footprints can be warped to a circular footprint, see Westover "Interactive Volume Rendering," Upson, editor, *Proceedings of the Chapel Hill Workshop on Volume Visualization*, pages 9–16. University of North Carolina at Chapel Hill, Chapel Hill, N.C., May 1989. To render curvilinear grids, a stochastic Poisson resampling can generate a set of new points whose footprints are spheres or ellipsoids, see Mao "Splatting of Non Rectilinear Volumes Through Stochastic Resampling," *IEEE Transactions on Visualization and Computer Graphics*, 2(2):156–170, 1996.

Heckbert, in "Fundamentals in Texture Mapping and Image Warping" Master's Thesis, University of California at Berkeley, Department of Electrical Engineering and Computer Science, 1989, describes a rendering method that uses elliptical weighted average (EWA) filters to avoid aliasing of surface textures. However, that method only operates on 2D regularly sampled texture. In other words, that method can not be used directly with irregular point samples or volume data sets.

Therefore, there is a need for a splatting method that can render a volume data set including irregularly spaced sample points without blurring, aliasing, popping, and other annoying artifacts present with prior art splatting techniques.

SUMMARY OF THE INVENTION

The present invention provides a novel rendering method that combines the projection of an elliptical 3D Gaussian reconstruction kernel function with a elliptical 2D Gaussian low-pass filter to produce a single splat primitive a screen space, that is an EWA continuous resampling filter. This 2D EWA resampling filter can be applied directly to discrete sample points in screen space. The EWA resampling filter according to the invention prevents aliasing artifacts and excessive blurring in the image. Moreover, the invention works with arbitrary elliptical 3D Gaussian reconstruction kernels and arbitrary Gaussian low-pass filter functions, and efficiently supports rectilinear, curvilinear, and irregular volumes, and perspective projection.

The method according to the invention is based on a novel framework to determine the continuous 2D EWA resampling filter. Effectively, the method transforms the volume data set, or any other set of discrete sample points defined in object space, first to camera space, then to ray space, and finally to screen space. This transformation is equivalent to a projection, e.g. a perspective or orthonormal projection. By using a local affine approximation at each discrete sample point, we combined the continuous 3D reconstruction kernel and 2D filter functions into a single analytic expression, i.e., the continuous 2D EWA resampling filter. We then apply the continuous EWA resampling filter each discrete sample point in screen space to reconstruct a continuous image. Then, the continuous image can be directly rasterized by a rendering engine using, for example, forward differencing with a single 1D footprint table for all resampling filters and any viewing direction. Other rendering techniques to convert the continuous functions to pixels of the output image can also be used.

The splat primitive according to the invention can be integrated easily into conventional splatting methods. Because of the flexibility of this splatting primitive, it can be utilized to render rectilinear, curvilinear, or irregular volume data sets. By "flattening" the continuous resampling filter along the volume gradient, surface splats that are suitable for high quality iso-surface rendering can easily be computed.

More specifically, the invention provides a method for producing an image from a set of discrete sample points. The sample points can define a 3D volume or surface. Each discrete sample point is projected to a screen space. A continuous resampling filter for each sample point is generated in screen space. The continuous resampling filter is a combination of a continuous reconstruction function and a continuous filter function for the sample point in screen space. The continuous resampling filter is then applied to each corresponding discrete sample in the screen space to generate a continuous sample for the image. The continuous samples can be rasterized to pixels using any known rasterization process or method.

DETAILED DESCRIPTION OF THE PREFERRED EMBODIMENT

We first describe a projection performed on a set of discrete sample points, for example, a volume data set, so that continuous 3D reconstruction kernels can be applied. Then, we describe how our analytical EWA splatting primitive is derived.

Volume Rendering Pipeline

There are two fundamental approaches to volume rendering. In backward mapping, rays are cast from pixels in an image plane into a volume data set. Forward mapping maps the volume data set directly onto the image plane.

Figure 1:
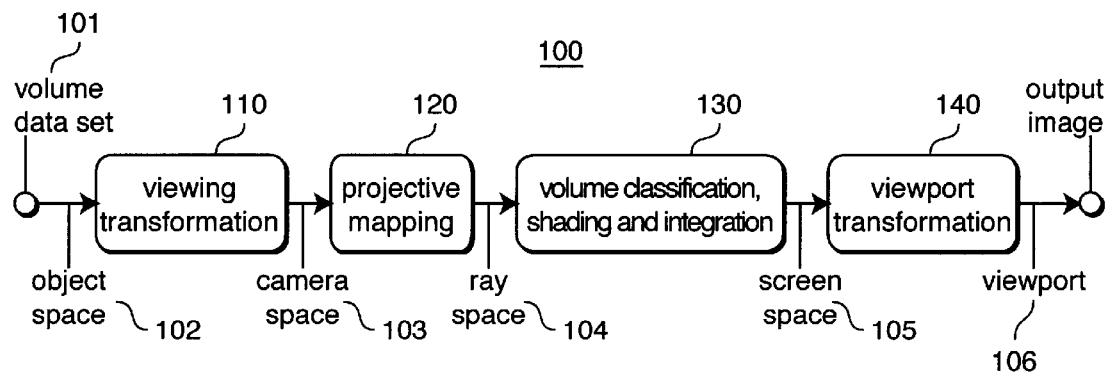
FIG. 1 is a block diagram of transformations on a volume data set according to the invention.

Our invention, as shown in FIG. 1, uses a forward mapping rendering engine 100. Note that here we use the terms "space" and "coordinate system" synonymously.

A set of discrete sample points, e.g., a volume data set 101, defined in object space 102, undergoes a viewing transformation 110 into camera space 103 to enable rendering of the samples from any arbitrary viewpoint. The camera space 103 is defined such that its origin is at the center of projection. Then, projective mapping 120 transforms the samples into ray space 104. Ray space is a non-Cartesian coordinate system that enables easy formulation of the rendering equation. In ray space, the viewing rays are parallel to a coordinate axis, facilitating analytical integration of the rendering functions. Step 130 performs sample classification, shading, and integration on samples in ray space. The output of step 130 is in screen space. 105 Finally, a viewport transformation 140 produces an output image 109 in viewport space 106.

For details on sample classification and shading in a forward mapping pipeline see Mueller, T. Moeller, and R. Crawfis "Splatting Without the Blur," *Proceedings of the 1999 IEEE Visualization Conference*, pages 363–370. October 1999.

Splatting Procedures

Figures 2A, 2B:
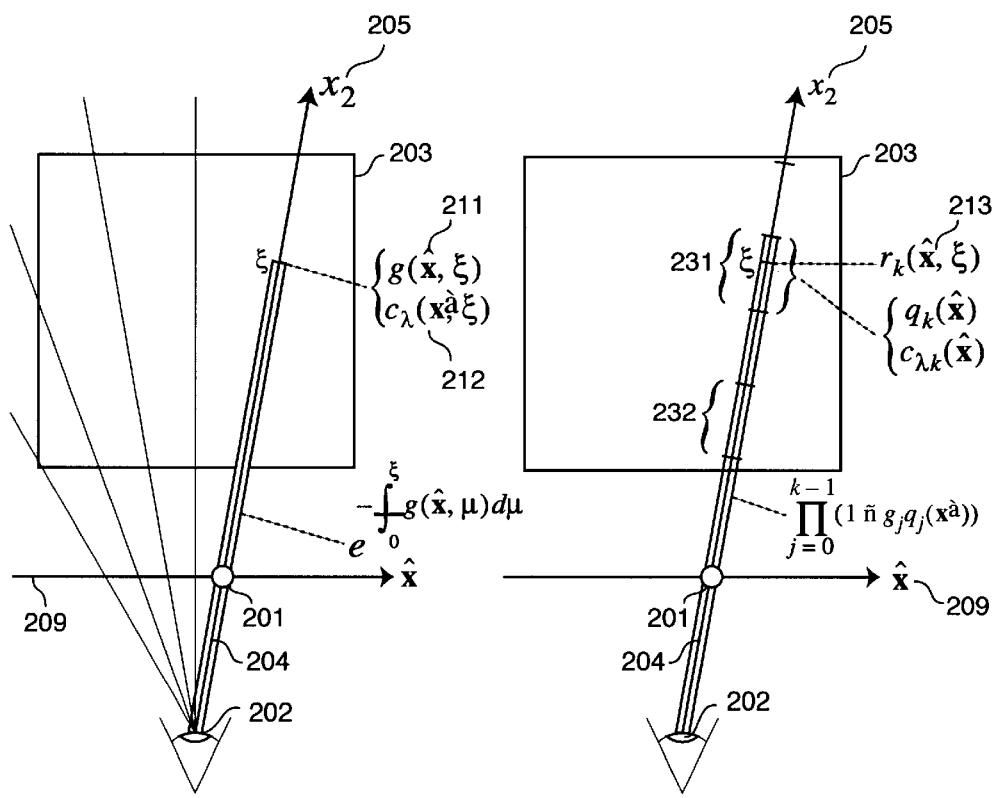
FIGS. 2a–b are block diagrams of volume rendering and splatting function.

FIGS. 2a shows prior art ray casting, FIG. 2b shows the framework of the splatting process used by our invention. Because of their efficiency, splatting processes belong to the most popular forward mapping volume rendering techniques, see Mueller et al., and L. Westover "Footprint Evaluation for Volume Rendering" *Computer Graphics*, Proceedings of SIGGRAPH 90, pages 367–376. 1990.

We modify the conventional notation and describe our expression of ray space 104. We denote a discrete sample point in ray space 104 by a vector 201 of three coordinates $x=(x_0, x_1, x_2)^T$, where T denotes that this vector is transposed, i.e. it is a column vector, not a row vector. Given a center of projection 202 and a projection plane 203, these three coordinates are interpreted geometrically as follows.

The coordinates $x_0$ and $x_1$ specify a point on the projection plane. A ray 204 intersecting the center of projection and the point $(x_0, x_1)$ on the projection plane is called a viewing ray. Using the abbreviation $\hat{x}=(x_0, x_1)$, we refer to the viewing ray passing through $(x_0, x_1)$ as $\hat{x}$ 209. A third coordinate $x_2$ 205 specifies a Euclidean distance from the center of projection 202 to a point on the viewing ray.

To simplify the notation, we use any of the synonyms x, $(\hat{x}, x_2)^T$, or $x=(x_0, x_1, x_2)^T$ to denote a 3D point in ray space.

The low-albedo approximation of the volume rendering equation describes a light intensity $I_\lambda(\hat{x})$ at a wavelength $\lambda$ that reaches the center of projection along the ray $\hat{x}$ with length L as:

$$I_\lambda(\hat{x}) = \int_0^L c_\lambda(\hat{x}, \xi) g(\hat{x}, \xi) e^{-\int_0^\xi g(\hat{x}, \mu) d\mu} d\xi, \quad (1)$$

where g(x) 211 is an extinction function that defines the rate of light occlusion, and $c_\lambda(x)$ 212 is an emission coefficient. The exponential term can be interpreted as an attenuation factor. Finally, the product $c_\lambda(x)g(x)$ is called a source term. The source term describes the light intensity scattered in the direction of the ray $\hat{x}$ 209 at the point $x_2$, see N. Max "Optical Models for Direct Volume Rendering" *IEEE Transactions on Visualization and Computer Graphics*, 1(2):99–108, 1995.

An extinction function g(x) is a weighted sum of coefficients $g_k$ and 3D reconstruction kernels $r_k(x)$ 213. This corresponds to a physical model where the volume data set is represented by individual discrete sample points that absorb and emit light. Hence, the extinction function is:

$$g(x) = \sum_k g_k r_k(x). \quad (2)$$

In this model, the 3D reconstruction kernels $r_k(x)$ reflect position and shape of individual sample points. With our invention, the sample points can be irregularly spaced and may differ in shape, hence the representation in Equation (2) is not restricted to regular volume data sets. We substitute Equation (2) into Equation (1). This yields:

$$I_\lambda(\hat{x}) = \sum_k \left( \int_0^L c_\lambda(\hat{x}, \xi) g_k r_k(\hat{x}, \xi) \prod_j e^{-g_j \int_0^\xi r_j(\hat{x}, \mu) d\mu} d\xi \right). \quad (3)$$

To compute this function numerically, splatting algorithms make several simplifying assumptions, illustrated in FIG. 2b. Usually the 3D reconstruction kernels $r_k(x)$ have local support. We assume that these local support areas do not overlap along a ray, and the reconstruction kernels are ordered front to back. We also assume that the emission coefficient is constant in the support of each reconstruction kernel along a ray. Moreover, we approximate the exponential function with the first two terms of its Taylor expansion. Finally, we ignore self-occlusion. According to these assumptions, we rewrite Equation (3) as:

$$I_\lambda(\hat{x}) = \sum_k c_{\lambda k}(\hat{x}) g_k q_k(\hat{x}) \prod_{j=0}^{k-1} (1 - g_j q_j(\hat{x})), \quad (4)$$

where $q_k(\hat{x})$ denotes an integrated reconstruction kernel, hence:

$$q_k(\hat{x}) = \int_R r_k(\hat{x}, x_2) dx_2. \quad (5)$$

Equation (4) is the basis for our EWA splatting method.

Westover, in "Footprint Evaluation for Volume Rendering" *Computer Graphics*, Proceedings of SIGGRAPH 90, pages 367–376, 1990 describes a footprint function for integrating reconstruction kernels $q_k$. His footprint function specifies the contribution of each sample point to pixels of the image. In volume rendering as shown in FIG. 2b, integrating 231—231 reconstruction kernels along the viewing ray 205 is analogous to projecting a single volume reconstruction kernel onto the image plane and evaluating the footprint function $q_k$. The coordinates $\hat{x}=(x_0, x_1)^T$ are also called screen coordinates, and $I_\lambda(\hat{x})$ and $q_k(\hat{x})$ are defined in screen space 105.

Splatting is efficient because it can use pre-integrated reconstruction kernels. Here, the projection of each sample point onto the image plane is determined using a 2D convolution. In contrast, ray-casting methods require a 3D convolution for each sample point. Thus, splatting methods have an inherent advantage in rendering efficiency. Moreover, splatting facilitates the use of higher quality kernels with a larger extent than the trilinear kernels typically employed by ray-casting.

However, prior art splatting methods are plagued by artifacts because of incorrect visibility determination. This problem is unavoidably introduced by the assumption that the reconstruction kernels do not overlap and are ordered back to front. Prior art splatting methods also tend to blur the image for zoomed in views.

Our invention provides a novel splat primitive that provides high quality anti-aliasing without blurring the image. It efficiently supports 3D elliptical reconstruction kernels. In addition, our splat primitive is compatible with known rendering processes and pipelines.

Aliasing in Rendering

Aliasing is a fundamental problem of any rendering method. Aliasing arises whenever a continuous image is sampled to a discrete raster grid, i.e., the pixel grid. Aliasing leads to visual artifacts such as jagged silhouette edges and Moiré patterns in textures. Typically, these problems become most disturbing during animations. From a signal processing point of view, aliasing is well understood. A continuous function has to be band-limited to respect the Nyquist frequency of a discrete sampling grid. This guarantees that there are no aliasing artifacts in the sampled image.

We describe a method that band-limits the splatting process of FIG. 2b. The splatting Equation (4) represents the output image as a continuous function $I_\lambda(\hat{x})$ in screen space. In order to properly sample this continuous function to a discrete output image without aliasing artifacts, the function has to be band-limited to match the Nyquist frequency of the discrete image.

We achieve this band-limitation by convolving $I_\lambda(\hat{x})$ with an appropriate low-pass filter $h(\hat{x})$, yielding an antialiased splatting primitive $$(I_\lambda \otimes h)(\hat{x}) = \int_{R^2} \sum_k c_{\lambda k}(\eta) g_k q_k(\eta) \prod_{j=0}^{k-1} (1 - g_j q_j(\eta)) h(\hat{x} - \eta) d\eta \quad (6)$$

Although $I_\lambda(\hat{x})$ is formulated as a continuous function in Equation (4), in practice this function is evaluated only at discrete positions, i.e., the pixel centers. Therefore, we make two simplifying assumptions to rearrange the integral in Equation (6). This leads to an approximation that can be evaluated efficiently. First, if the emission coefficient is approximately constant in the support of each footprint $q_k$, then $c_{\lambda,k}(\hat{x}) \approx c_{\lambda,k}$, for all $\hat{x}$ in the support area. If the emission coefficient is constant in the support of each reconstruction kernel along a viewing ray, then the emission coefficient is constant in the complete 3D support of each reconstruction kernel. In other words, we ignore the effect of shading for anti-aliasing. Note that this is the common approach for anti-aliasing surface textures as well.

Second, we also assume that the attenuation factor has an approximately constant value $o_k$ in the support of each footprint function. Hence, $$\prod_{j=0}^{k-1}(1-g_j q_j(\hat{x})) \approx o_k \tag{7}$$

for all $\hat{x}$ in the support area. A variation of the attenuation factor indicates that the basis function is partially covered by a more opaque region in the set of discrete sample points. Therefore this variation can be interpreted as a "soft" edge. Ignoring such situations means that we cannot prevent edge aliasing. Again, this is similar to rendering surfaces, where edge and texture aliasing are handled by different processes as well.

Exploiting these simplifications, we can rewrite Equation (6) as:

$$(I_\lambda \otimes h)(\hat{x}) \approx \sum_k c_{\lambda k} o_k g_k \int_{R^2} q_k(\eta) h(\hat{x}-\eta) d\eta$$
$$= \sum_k c_{\lambda k} o_k g_k (q_k \otimes h)(\hat{x}).$$

We call $$\rho_k(\hat{x}) = (q_k \otimes h)(\hat{x}) \tag{8}$$

an ideal resampling filter. This resampling filter combines a footprint function $q_k$ and a low-pass filter h. Hence, we perform anti-aliased splatting by replacing the footprint function $q_k$ with the ideal continuous resampling filter $\rho_k$. This means that instead of band-limiting the entire output function $I_\lambda(\hat{x})$, we band-limit each footprint function separately.

Under the conditions described above, our splatting produces a band-limited output function that respects the Nyquist frequency of the raster image and, therefore, avoids aliasing artifacts. Recall that the reconstruction kernels are integrated in ray space, resulting in footprint functions that vary significantly in size and shape across the volume. Hence, as an advantage, the our reconstruction kernel is strongly space variant.

An anti-aliasing technique for splatting, which is based on a uniform scaling of footprints is described by Swan et al. That technique produces good results only for radially symmetric footprints. However, for more general kernels, e.g., elliptical kernels, the uniform scaling of Swan et al. is a poor approximation of ideal low-pass filtering. Swan cannot avoid aliasing without introducing additional blurriness. In contrast, our method provides non-uniform scaling in these cases, leading to superior image quality, as described below.

Elliptical Weighted Average Gaussian Reconstruction Kernels

We choose elliptical 3D Gaussian reconstruction kernels because these have advantageous features. Gaussian reconstruction kernels are closed under affine mappings and convolution, and integrating a 3D Gaussian reconstruction kernel along one coordinate axis results in a 2D Gaussian reconstruction kernel. These properties enable us to analytically express the continuous resampling kernel of Equation (8) by a single 2D Gaussian, as described below.

In this section, we describe how we exploit the features of the continuous reconstruction kernels.

An elliptical Gaussian $Gv(x-p)$ centered at a point p with a variance matrix V is defined by:

$$Gv(x-p) = \frac{1}{2\pi |V|^{\frac{1}{2}}} e^{-\frac{1}{2}(x-p)^T V^{-1}(x-p)}, \tag{9}$$

where $|V|$ is the determinant of V. In this form, the Gaussian kernel is normalized to a unit integral. In the case of volume reconstruction kernels, $G_V$ is a 3D function, and hence, V is a symmetric 3×3 matrix, and x and p are the vectors $(x_0, x_1, x_2)^T$ and $(p_0, p_1, p_2)^T$, respectively.

We apply an arbitrary affine mapping $u=\Phi(x)$ to this Gaussian kernel. The affine mapping is $\Phi(x)=Mx+c$, where M is a 3×3 matrix and c is a vector $(c_0, c_1, c_2)^T$. We substitute $x=\Phi^{-1}(u)$ in Equation (9), yielding:

$$G_V(\Phi^{-1}(u)-p) = \frac{1}{|M^{-1}|} G_{MVM^T}(u-\Phi(p)). \tag{10}$$

Moreover, convolving two Gaussian functions with variance matrices V and Y results in a single Gaussian function with variance matrix V+Y:

$$(G_V \otimes G_Y)(x-p) = G_{V+Y}(x-p). \tag{11}$$

Finally, integrating the 3D Gaussian function $G_V$ along one coordinate axis yields a 2D Gaussian function $G_{\hat{V}}$, hence:

$$\int_R G_V(x-p) dx_2 = G_{\hat{V}}(\hat{x}-\hat{p}) \tag{12}$$

where $\hat{x}=(x_0, x_1)^T$ and $\hat{p}=(p_0, p_1)^T$. The 2×2 variance matrix $\hat{V}$ is obtained from the 3×3 matrix V by skipping the third row and column:

$$V = \begin{pmatrix} a & b & c \\ b & d & e \\ c & e & f \end{pmatrix} \Leftrightarrow \begin{pmatrix} a & b \\ b & d \end{pmatrix} = \hat{V}. \tag{13}$$

The Viewing Transformation

The 3D reconstruction kernels are initially defined in object space 102 which has coordinates $t=(t_0, t_1, t_2)^T$. We express the kernels in object space by:

$$r_k''(t) = G_{V_k''}(t-t_k),$$

where $t_k$ are the sample points in object space. For regular volume data sets, the variance matrices $V_k''$ are usually identity matrices. For rectilinear data sets, the variance matrices are diagonal matrices where the matrix elements contain the squared distances between sample points along each coordinate axis. With curvilinear volumes, the variance matrices can be determined as described by Mao et al. in "Splatting of Curvilinear Volumes, *IEEE Visualization '95 Proc.*, pages 61–68. 1995.

We denote coordinates of camera space 103 by a vector $u=(u_0,u_1,u_2)^T$. Object coordinates are transformed to camera space using an affine mapping $u=\phi(t)$, called the viewing transformation 110. It is defined by a matrix W, and a translation vector d as $\phi(t)=Wt+d$. We transform the reconstruction kernels $G_{V_k''}(t-t_k)$ to camera space by substituting $t=\phi^{-1}(u)$, and using Equation (10) to produce:

$$G_{V_k''}(\varphi^{-1}(u)-t_k) = \frac{1}{|W^{-1}|}G_{V_k'}(u-u_k) = r_k'(u), \quad (14)$$

where $u_k=\phi(t_k)$ is the center of the Gaussian reconstruction kernel in camera coordinates, and $r_k'(u)$ denotes the reconstruction kernel in camera space.

According to Equation (10), the variance matrix in camera coordinates $V_k'$ is given by $V_k'=WV_k''W^T$.

Projective Transformation

Figure 3A:
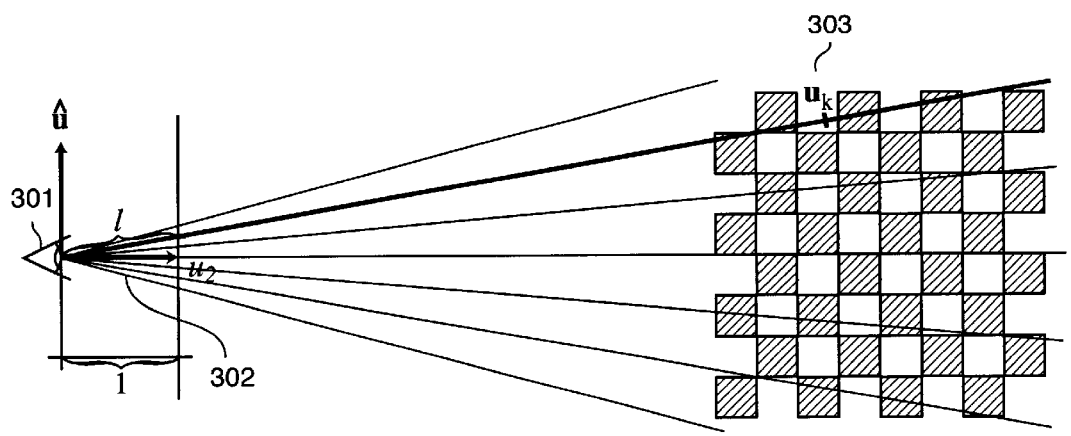
FIGS. 3a–b are block diagrams of transformations from camera space to ray space.
Figure 3B:
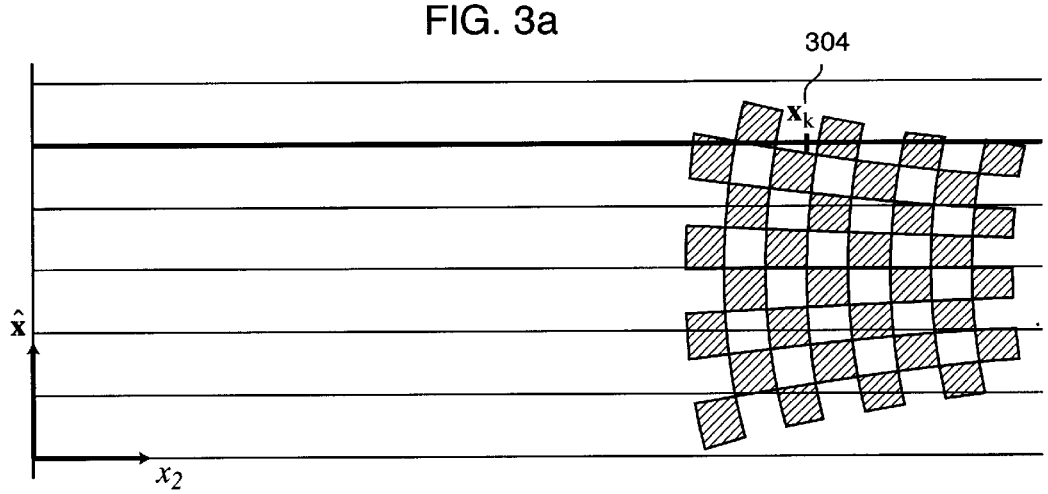

The projective transformation 120 converts camera coordinates as shown in FIG. 3a to ray coordinates as shown in FIG. 3b. Camera space is defined such that the origin of the camera space is at the center of projection 301 and the projection plane is the plane 302 $u_2=1$. Camera space and ray space are related by the mapping $x=m(u)$. Using the definition of ray space from above, $m(u)$ and its inverse $m^{-1}(x)$ are therefore given by:

$$\begin{pmatrix} x_0 \\ x_1 \\ x_2 \end{pmatrix} = m(u) = \begin{pmatrix} u_0/u_2 \\ u_1/u_2 \\ \|(u_0,u_1,u_2)^T\| \end{pmatrix} \quad (15)$$

and $$\begin{pmatrix} u_0 \\ u_1 \\ u_2 \end{pmatrix} = m^{-1}(x) = \begin{pmatrix} x_0/l \cdot x_2 \\ x_1/l \cdot x_2 \\ 1/l \cdot x_2 \end{pmatrix} \quad (16)$$

where $l=\|(x_0,x_1,1)^T\|$.

Unfortunately, these mappings are not affine, so we cannot apply Equation (10) directly to transform the reconstruction kernels from camera to ray space.

To solve this problem, we provide a local affine approximation $m_{u_k}$ of the projective transformation. This approximation is defined by the first two terms of the Taylor expansion of m at the point $u_k$ 303:

$$m_{u_k}(u)=x_k+J_{u_k}\cdot(u-u_k), \quad (17)$$

where the point $x_k$ 304 is equivalent to $m(u_k)$, and is the center of the Gaussian reconstruction kernel in ray space. The Jacobian $J_{u_k}$ is given by the partial derivatives of m at the point $u_k$ 303:

$$J_{u_k} = \frac{\partial m}{\partial u}(u_k).$$

In the following, we omit the subscript $u_k$, hence m(u) denotes the local affine approximation of Equation (17). We substitute $u=m^{-1}(x)$ in Equation (14), and apply Equation (10) to map the reconstruction kernels to ray space 104, yielding the desired expression for $r_k(x)$:

$$r_k(x) = \frac{1}{|W^{-1}|}G_{V_k'}(m^{-1}(x)-u_k) \quad (18)$$

$$= \frac{1}{|W^{-1}||J^{-1}|}G_{V_k}(x-x_k),$$

where $V_k$ is the variance matrix in ray coordinates. According to Equation (10), $V_k$ is given by:

$$V_k = JV_k'J^T \quad (19)$$

$$= JWV_k''W^TJ^T.$$

Note that for uniform or rectilinear sample sets, $V'_k$ has to be determined only once per frame, because $V''_k$ is the same for all sample points, and W changes only from frame to frame.

However, because the Jacobian is different for each sample point, $V_k$ has to be recalculated for each sample point. In the case of curvilinear or irregular volumes, each 3D reconstruction kernel has an individual variance matrix $V''_k$. Our method elegantly handles this situation, requiring only one additional 3×3 matrix multiplication.

In contrast, prior art methods laboriously cope with anisotropic 3D reconstruction kernels by first determining their projected extents in screen space, and then mapping the projection to a circular footprint. Those methods are computationally expensive, and lead to a bad approximation of the integral of the reconstruction kernel as pointed out by Mueller at al. and Swan et al.

Figure 4A:
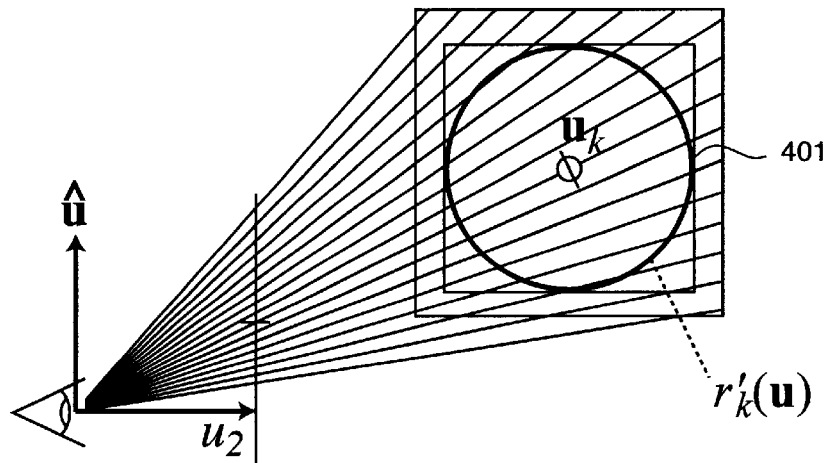
FIGS. 4a–c are block diagrams of transformations of a reconstruction kernel from camera space to ray space.
Figures 4B, 4C:
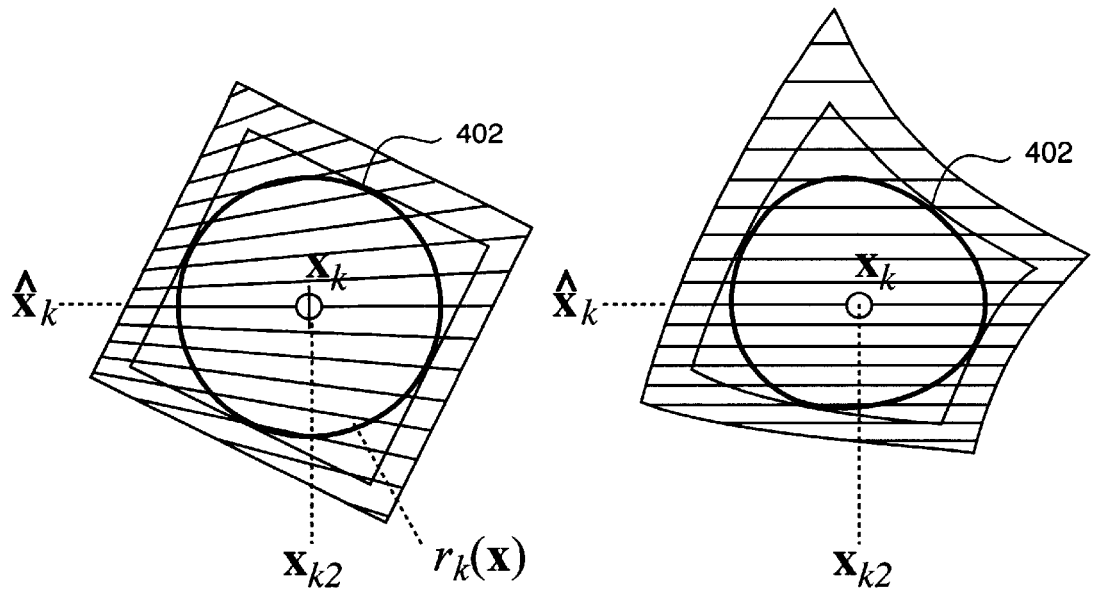

FIG. 4a shows a mapping of our reconstruction kernel to camera space 103, FIG. 4b a local affine mapping to ray space 104, and FIG. 4c an exact mapping in ray space. FIG. 4c is exaggerated to show the non-linear effects in the exact mapping. The local affine mapping is exact only for the ray passing through $u_k$ or $x_k$ 402, respectively. The affine mapping essentially approximates the perspective projection with an oblique orthographic projection. Therefore, parallel lines are preserved, and approximation errors grow with increasing ray divergence. However, the errors do not lead to visual artifacts, in general, because the fan of rays intersecting a reconstruction has a small opening angle due to the local support of the kernels.

Prior art splatting typically begins with mappings of the footprint functions to polygons in camera space. In a next step, the splatted polygons are projected to screen space, and then rasterized to a footprint image. However, that requires significant computational effort.

In contrast, our splatting efficiently projects the set of sample points to screen space 105, which requires only the computation of the Jacobian and two 3×3 matrix multiplications. Then, our continuous resampling kernel is applied directly to the sample points in screen space.

Integration and Band-Limiting

We integrate the Gaussian reconstruction kernel of Equation (18), according to Equation (5), resulting in a Gaussian (continuous) basis function $q_k$:

$$q_k(\hat{x}) = \int_R \frac{1}{|J^{-1}||W^{-1}|}G_{V_k}(\hat{x}-\hat{x}_k, x_2-x_{k2})dx_2 \quad (20)$$

$$= \frac{1}{|J^{-1}||W^{-1}|}G_{V_k^q}(\hat{x}-\hat{x}_k)$$

where the 2×2 variance matrix $V_k^q$ of the basis function is obtained from $V_k$ by skipping the last row and column, as shown in Equation (13). Finally, we choose a Gaussian (continuous) low-pass filter function $h=G_{V^h}(\hat{x})$, where the variance matrix $V^h \in R^{2\times 2}$ is typically the identity matrix.

With Equation (11), we can elegantly determine the convolution in Equation (8), yielding our continuous EWA resampling filter:

$$\rho_k(\hat{x}) = (q_k \otimes h)(\hat{x}) \qquad (21)$$

$$= \frac{1}{|J^{-1}||W^{-1}|}\left(G_{V_k^q} \otimes G_{Vh}\right)(\hat{x} - \hat{x}_k)$$

$$= \frac{1}{|J^{-1}||W^{-1}|}G_{V_k^q + Vh}(\hat{x} - \hat{x}_k).$$

Reduction from 3D to 2D Continuous Reconstruction Kernels

Because our EWA continuous reconstruction kernel is an arbitrary Gaussian, we can accurately render a volume data set by appropriately selecting the shape of the reconstruction kernels. For example, we can improve the precision of iso-surface rendering by flattening our continuous reconstruction kernels along the directions of the surface normals.

Also, an infinitesimally flat continuous reconstruction kernel is equivalent to a Gaussian surface texture reconstruction kernel. In other words, we can extract and render a surface representation from a volume data set directly by flattening the our volume reconstruction kernel in 3D to a surface reconstruction kernel in 2D.

Figure 5:
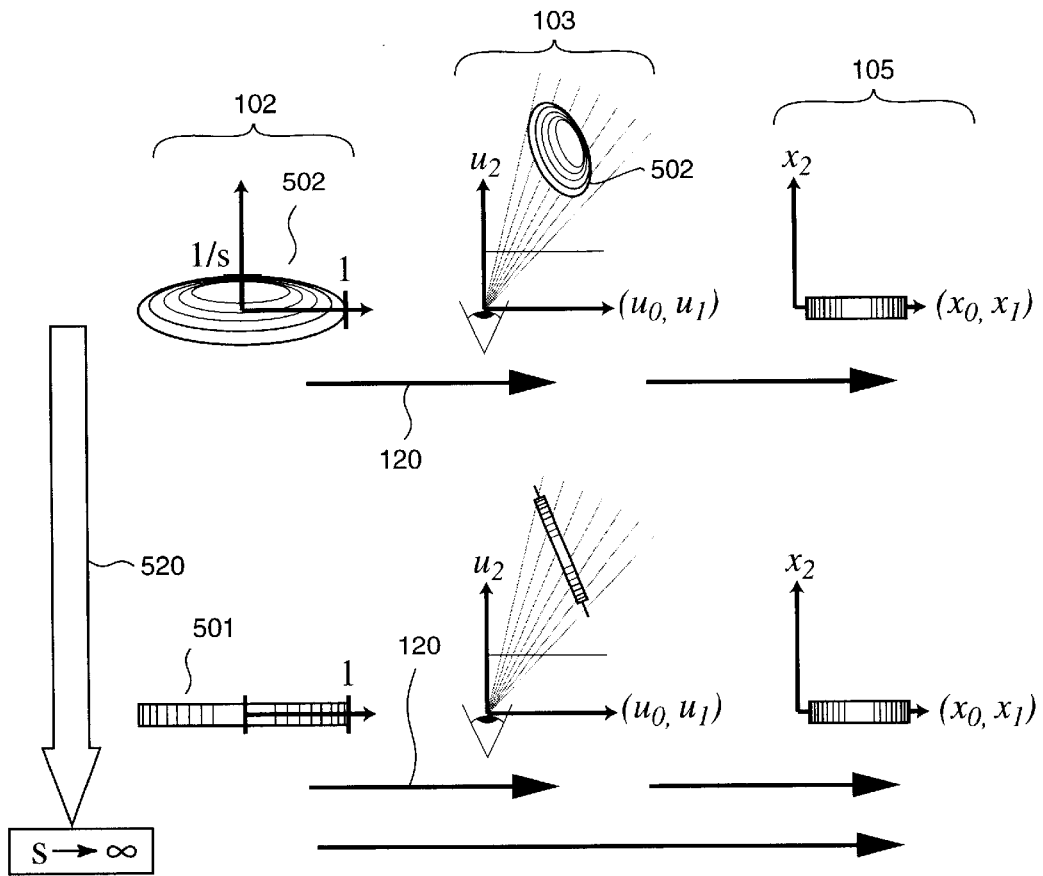
FIG. 5 is a diagram of 3D and 2D reconstruction kernels according to the invention.

FIG. 5 shows rendering with 3D and 2D continuous reconstruction kernels according to the invention. We construct the "flattened" Gaussian reconstruction kernel 501 in object space 102 by scaling 520 a spherical Gaussian reconstruction kernel 502 in one direction by a factor 1/s. Hence, its variance matrix is:

$$V'' = \begin{pmatrix} 1 & 0 & 0 \\ 0 & 1 & 0 \\ 0 & 0 & \frac{1}{s^2} \end{pmatrix}.$$

A scaling factor s=1 corresponds to a spherical 3D kernel. In the limit, we get the circular 2D kernel when s=∞. To render the reconstruction kernels 501–502, we first apply the 3D viewing transformation matrix W, which may contain arbitrary modeling transformations with the viewing transformation. Then, we use the local affine approximation of Equation (17) to map the kernels to ray space. The variance matrix V of the reconstruction kernels in ray space is determined according to Equation (19). A matrix $T^{3D}$ denotes the concatenated 3D mapping matrix $T^{3D}=JW$, and we express V as:

$$V = JWV''W^T J^T = T^{3D}V''T^{3D^T}.$$

Hence, the elements $v_{ij}$ of V are given by:

$$v_{00} = t_{00}^2 + t_{01}^2 + \frac{t_{02}^2}{s^2}$$

$$v_{01} = v_{10} = t_{00}t_{10} + t_{01}t_{11} + \frac{t_{02}t_{12}}{s^2}$$

$$v_{02} = v_{20} = t_{00}t_{20} + t_{01}t_{21} + \frac{t_{02}t_{22}}{s^2}$$

$$v_{11} = t_{10}^2 + t_{11}^2 + \frac{t_{12}^2}{s^2}$$

$$v_{12} = v_{21} = t_{10}t_{20} + t_{11}t_{21} + \frac{t_{12}t_{22}}{s^2}$$

$$v_{22} = t_{20}^2 + t_{21}^2 + \frac{t_{22}^2}{s^2},$$

where we denote an element of $T^{3D}$ by $t_{ij}$. We determine the 2D Gaussian basis function by integrating the reconstruction kernel. According to Equation (13), its 2D variance matrix is obtained by skipping the third row and column in V. As s approaches infinity, we get the following 2D variance matrix $$V^q = \begin{pmatrix} t_{00}^2 + t_{01}^2 & t_{00}t_{10} + t_{01}t_{11} \\ t_{00}t_{10} + t_{01}t_{11} & t_{10}^2 + t_{11}^2 \end{pmatrix}. \qquad (22)$$

Conveniently, the 2D variance matrix can be factored into a 2D mapping $T^{2D}$, which is obtained from the 3D mapping matrix by skipping the third row and column:

$$V^q = T^{2D}T^{2D^T} = \begin{pmatrix} t_{00} & t_{01} \\ t_{10} & t_{11} \end{pmatrix}\begin{pmatrix} t_{00} & t_{10} \\ t_{01} & t_{11} \end{pmatrix}. \qquad (23)$$

We now analyze the 2D mapping matrix $T^{2D}$. First, we compute an explicit expression for the Jacobian J of the projective mapping. Using Equation (15), it is given by:

$$J = \begin{pmatrix} 1/u_2 & 0 & -u_0/u_2^2 \\ 0 & 1/u_2 & -u_1/u_2^2 \\ u_0/l' & u_1/l' & u_2/l' \end{pmatrix}, \qquad (24)$$

where $l'=\|(u_0,u_1,u_2)^T\|$. With $l'=\|(u_0,u_1,u_2)^T\|$, we use the first two rows of J and the first two columns of W to factor $T^{2D}$ into:

$$T^{2D} = \begin{pmatrix} 1/u_2 & 0 & -u_0/u_2^2 \\ 0 & 1/u_2 & -u_1/u_2^2 \end{pmatrix}\begin{pmatrix} w_{00}w_{01} \\ w_{10}w_{11} \\ w_{20}w_{21} \end{pmatrix}$$

where $w_{ij}$ denotes an element of W.

Figure 6:
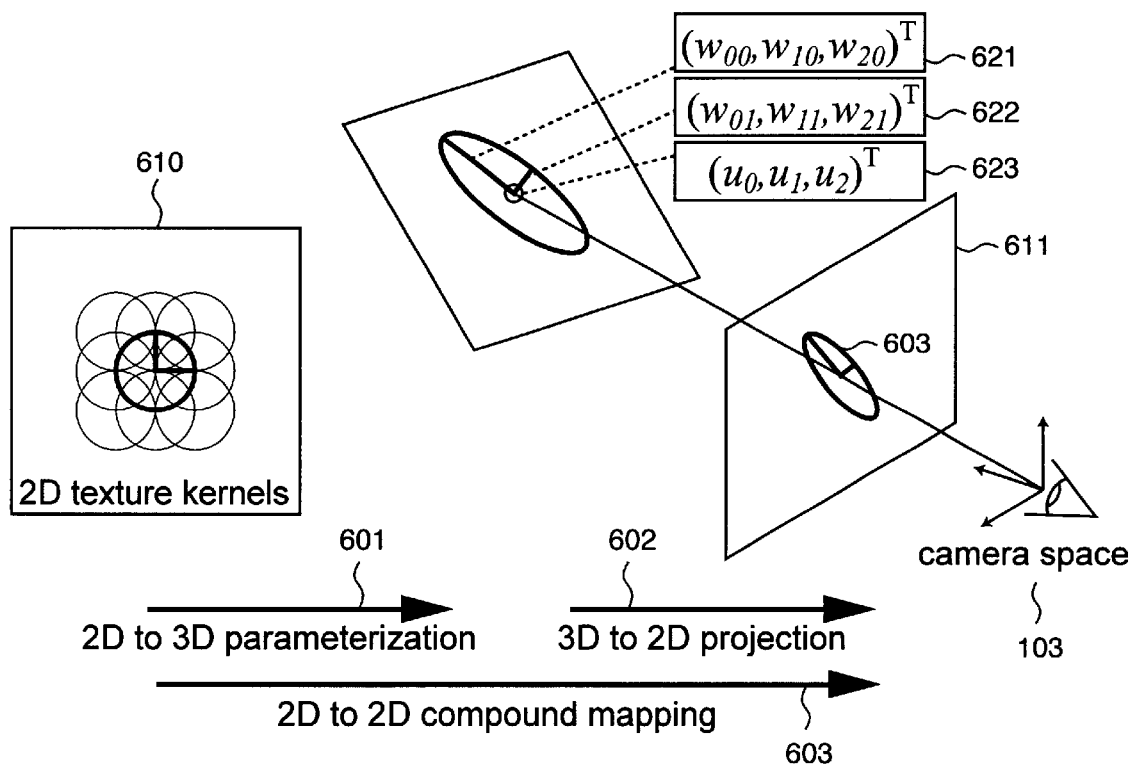
FIG. 6 are diagrams of the steps of iso-surface rendering.

As shown in FIG. 6, this can be interpreted as a concatenation of a 2D to 3D parameterization 601 with a 3D to 2D projection 602, resulting in a compound 2D to 2D mapping 603.

The first stage is a parameterization of a 3D plane. It maps each circular 2D texture kernel 610 onto a plane 611 defined by the two vectors $(w_{00}, w_{10}, w_{20})^T$ 621 and $(w_{01}, w_{10}, w_{21})^T$ 602 in 3D camera space 103, resulting in an ellipse 603. The second stage is an oblique parallel projection with an additional scaling factor $1/u_2$, which is the local affine approximation of the perspective projection. Finally, combining the elliptical basis function with a low-pass filter, as in Equation (8), yields a texture filter according to our invention.

The Volume Splatting Method

The volume splatting method, in its most basic form, can be expressed by the following pseudo code:

```
for each sample point P[k]{
    project P[k] to screen space;
    determine a resampling kernel ρ[k];
    splat P[k] with ρ[k] to generate pixels p[x];
    for each p[x]{
        shade p[x]}
```

In the following sections, we extend our splatting method to perform texture acquisition and mapping for point-sampled objects and surfaces, to handle transparent objects, models and surfaces, and to perform edge anti-aliasing.

Texture Filter and Point-Sampled Models

In conventional polygonal rendering, texture coordinates are usually stored for each vertex. This enables the rendering engine to combine the mappings between 2D texture, 3D object, and 2D screen space into a compound 2D-to-2D direct mapping between texture and screen space. Using this mapping, pixel colors are determined by looking up and filtering texture samples in 2D texture space at rendering time.

However, a compound mapping function is not available for sample point-based objects at rendering time. Consequently, we store an explicit texture representation in object space. We represent point-based objects as a set of irregularly spaced point-samples $\{P_k\}$ in three dimensional object space without connectivity. A point-sample $P_k$ has a position $u_k$ and a normal. Each sample point has an associated reconstruction kernel as described above in Equation (2).

For the purpose of texture acquisition during a pre-processing step, we rename this basis function a texture function $r_k$ with weighting coefficient $w_k$. Although we describe our texture acquisition process for surface texturing, it should be understood that the same process can also be used for volume texturing.

Texture Acquisition

Instead of performing texture mapping as a post-processing step during rendering, our textures are pre-computed. We map the basis function as described by Equation (2) to texture space. There, it is always in the form of an ellipse. We evaluate the basis function in texture space to determine a texture value (color) that is then assigned to the sample point in object space, see Table A below.

Determining the Basis Functions

As described above, the basis functions $r_k$ are Gaussians with variance matrices $V^q$. In 2D, the variance matrix of Equation (22) can be simplified as:

$$V_k^r = \begin{pmatrix} \frac{1}{h^2} & 0 \\ 0 & \frac{1}{h^2} \end{pmatrix},$$

which scales the Gaussian by h. For example, the side-length h is given globally by the acquisition process that samples the positions $u_k$. As another possibility, the value h is chosen as the maximum distance between sample points in a small neighborhood. This value can be pre-computed and stored in a hierarchical data structure.

Determining the Weighting Coefficients

We distinguish between two different settings when determining the weighting coefficients $w_k$, expressed as $g_k$ in Equation (2): objects with per sample point color, and texture mapping with sample point-based objects.

Objects with per Sample Point Color

Many imaging systems, such as laser range scanners, or passive vision systems, directly acquire range and color information. In such cases, the acquisition process provides a color sample $c_k$ for each sample point. We determine a continuous surface approximation $f_c(u)$ of the unknown original texture function from the irregular set of samples $c_k$.

One computationally reasonable approximation is to normalize the texture functions $r_k$ to form a partition of unity, i.e., to sum up to one everywhere. Then, we use the samples as coefficients, hence $w_k = c_k$, and build a weighted sum of the samples $c_k$:

$$f_c(u) = \sum_{k \in N} c_k \hat{r}_k(u - u_k) = \sum_{k \in N} c_k \frac{r_k(u - u_k)}{\sum_{j \in N} r_j(u - u_j)},$$

where $\hat{r}_k$ are the normalized texture functions.

Texture Mapping of Sample Point-Based Objects

When an image or procedural texture is explicitly applied to point-sampled geometry, we provide a mapping function from object space to texture space as a pre-processing step. This allows us to warp the continuous texture function from object space with coordinates u to texture space with coordinates s. We then determine the unknown coefficients $w_k$ for (u) such that $c_k$ optimally approximates the texture.

From the samples $c_i$, and the sampling locations $s_i$ of the texture, the continuous texture function $c_c(s)$ is reconstructed using a texture reconstruction kernel n(s), yielding:

$$c_c(s) = \sum_i c_i n(s - s_i) = \sum_i c_i n_i(s).$$

In our method, the texture reconstruction kernel is also a Gaussian with unit variance, a common choice for regular textures. Applying the mapping u=t(s) from object space to texture, the warped texture function $\tilde{f}_c(u)$ is given by:

$$\tilde{f}_c(u) = c_c(t^{-1}(u)) = \sum_i c_i n_i(t^{-1}(u)).$$

With $\tilde{f}_c(u)$, we determine the weighting coefficients $w_k$ such that the error of the approximation provided by the surface function $f_c(u)$ is minimal. Utilizing the L2 norm, the problem is minimizing the following functional:

$$F(w) = \left\| \tilde{f}_c(u) - f_c(u) \right\|_{L_2}^2$$

$$= \left\| \sum_i c_i n_i(t^{-1}(u)) - \sum_k w_k r_k(u - u_k) \right\|_{L_2}^2,$$

where $w=(w_j)$ denotes the vector of unknown coefficients. Because F(w) is a quadratic function of the coefficients, it has a minimum at $\nabla F(w)=0$, yielding a set of linear equations.

We can define a linear system Rw=c. The elements of the matrix R and the vector c are given by the inner products:

$$(R)_{kj} = \langle r_k, r_j \rangle,$$

and $$(c)_k = \sum_i c_i \langle r_k, n_i \circ t^{-1} \rangle.$$

If the texture functions $r_k$ are orthonormal, then the inner products are given by $\langle r_k, r_j \rangle = \delta_{kj}$, where $\delta_{kj}=1$ if k=j, and $\delta_{kj}=0$ otherwise. Consequently, R is the identity matrix, and the coefficients are determined as in EWA filtering by:

$$w_k = \sum_i c_i \langle r_k, n_i \circ t^{-1} \rangle.$$

Pixels Data Structure

Following is a table that shows an example data structure that can be used for each pixel to be rendered. Besides color and normal components, each pixel contains the sum of the accumulated contributions of the reconstruction kernels, and screen space (depth) z values.

TABLE A

| Data | Storage (bytes) |
|---|---|
| RGB Color Components | 4 × 4 |
| XYZ Normal Components | 3 × 4 |
| Accumulations Components | 4 |
| Camera Space Value | 4 |
| Material Index | 2 |
| Total bytes per pixel | 38 |

Transparency

Our method provides order-independent transparency using a single rendering pass and a fixed size frame buffer. The general idea is to use a frame buffer that includes several layers or sheet buffers, each sheet buffer storing the pixel data listed in Table A.

A sheet buffer stores a fragment at each pixel. The purpose of the fragment is to collect the contributions of a single surface to the pixel. After all sample points have been splatted, the sheet buffers are composited, back-to-front, to produce the final pixel color. If there are a small fixed number l of fragments per pixel, then fragments are merged whenever the number of fragments exceeds a preset limit l.

For r transparency, we extend the splatting as follows.

Splatting the Resampling Kernel

In contrast to the single layered frame buffer, we now use a frame buffer that has several layers. Each layer stores a fragment per pixel. Each contribution that is splatted into a pixel is processed in three steps.

Accumulate-or-Separate Decision

Using a z threshold as described above, all fragments of the pixel are checked to see if they contain data of the same surface as the new contribution. If this is true, then the contribution is added to the fragment, and we are done. Otherwise, the new contribution is treated as a separate surface, and a temporary fragment is initialized with its data.

New Fragment Insertion

If the number of fragments including the temporary fragment is smaller than the limit l, then the temporary fragment is copied into a free slot in the frame buffer and we are done.

Fragment Merging

If the above is false, then two fragments are merged. Before merging, the fragments are shaded.

When fragments are merged, some information is inevitably lost, and visual artifacts may occur. These effects are minimized by using an appropriate merging strategy. Unfortunately, the situation is complicated by the fact that a decision has to be taken as the scene is being rendered, without knowledge about subsequent rendering operations. The main criterion for merging fragments is the difference between their z values. This reduces the chance that there are other surfaces that lie between the two merged surfaces and that are rendered later. In this case, incorrect back-to-front blending may introduce visual artifacts.

Before fragments can be merged, their final colors are determined by shading. Shaded fragments are indicated by setting their accumulated weight, see Table A, to a negative value. This guarantees that they are shaded exactly one time. The color and alpha values of the front and back fragment to be merged are $c_f; \alpha_f$, and $c_b; \alpha_b$, respectively. The color and alpha values $c_0; \alpha_0$ of the merged fragment are computed using:

$$c_0 = c_f \alpha_f + c_b \alpha_b (1 - \alpha_f)$$

$$\alpha_0 = \alpha_f + \alpha_b (1 - \alpha_f).$$

Fragments can also be shaded in a second pass, if necessary. After shading, the fragments of each pixel are blended back-to-front as described in the Equation above to produce the final pixel color.

Edge Anti-aliasing

In order to perform edge anti-aliasing, information about partial coverage of surfaces in fragments is needed. For point-based representations, one way to approximate coverage is to estimate the density of projected point-samples per pixel area. Coverage is then determined by measuring the actual density of sample points in the fragment and dividing the measured value by the estimated value.

Rather than explicitly determining this estimation, we make the simplifying assumption that the Gaussian basis functions are located on a regular grid and have unit variance. In this case, the basis functions approximate a partition of unity. In other words, we assume that the basis functions sum up to one at any point. Warping and band-limiting this constant function results in a constant function again. Therefore, the sum q of the resampling kernels is approximately one at any point, specifically in all fragments x:

$$q = \sum_{k \in N} \rho_k(x) \approx 1.$$

If q is smaller than one in a fragment, this indicates that the texture does not completely cover the pixel, and q can be used as a coverage coefficient. For an irregular grid, the approximation of the partition of unity becomes less reliable. Furthermore, the Gaussians are truncated to a finite support.

With a cut-off radius c=1, a threshold τ=0:4 for indicating full coverage generally produces good results. The coverage q' of a pixel is q'=q/τ.

We implement edge anti-aliasing by multiplying the alpha value of a fragment with its coverage coefficient. The final alpha value α' of the fragment is:

$$\alpha' = \begin{cases} a & \text{if } q' \geq 1 \\ a \cdot q' & \text{if } q' < 1 \end{cases}.$$

Results

Figure 7:
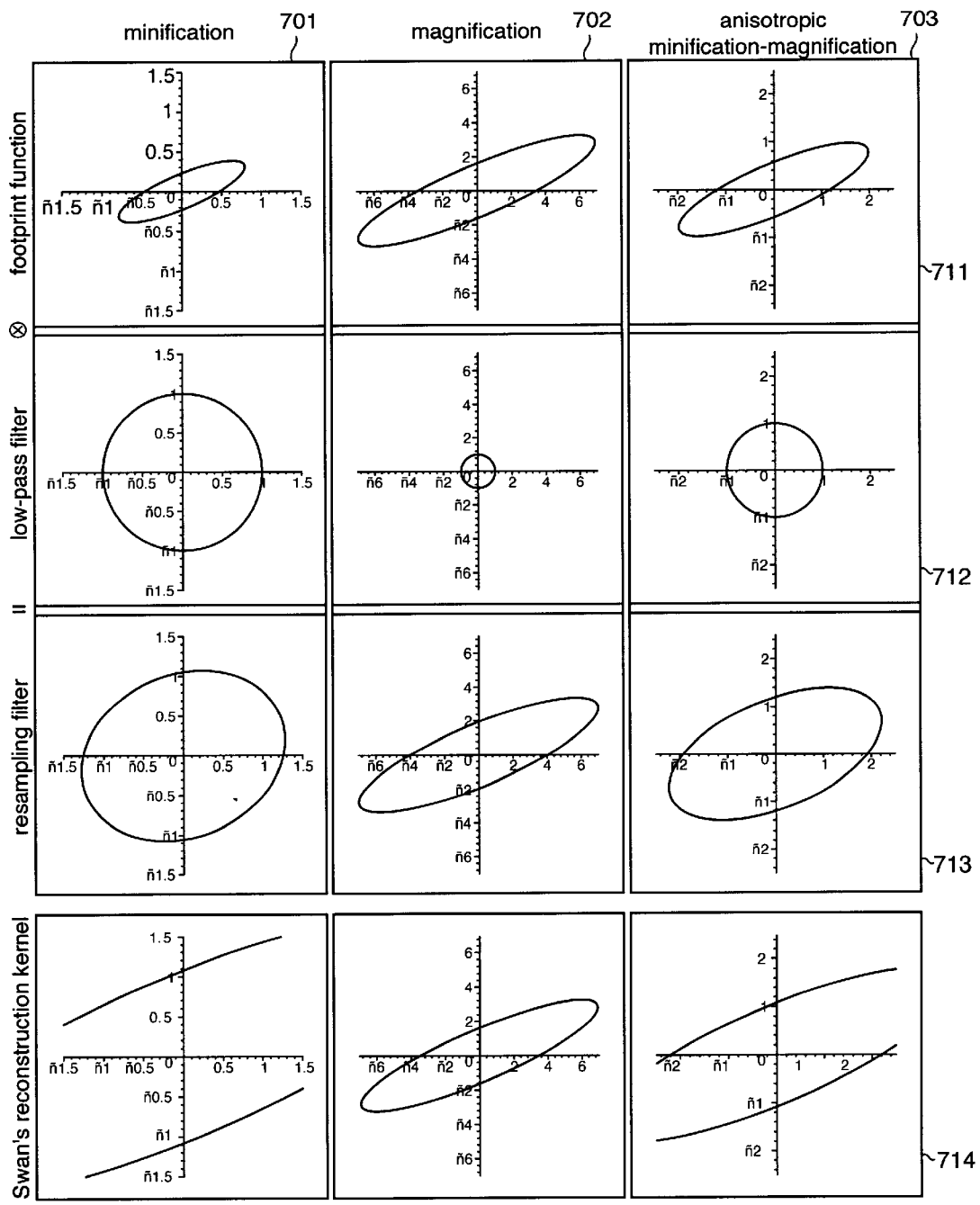
FIG. 7 is a block diagram of properties of the reconstruction kernel according to the invention.

FIG. 7 shows useful properties of the continuous reconstruction kernels according to the invention, and their advantages over prior art footprint filters. Columns 701, 702, and 703 show respectively minification, magnification, and anisotropic scaling where the kernels are minified in one direction and at the same time magnified in another direction. Rows 711 and 712 show respectively our continuous basis function and continuous low-pass filter function. Row 713 shows continuous reconstruction kernels that results from combining the basis function and low-pass filter function under the various conditions in columns 701–703. Row 714 show the prior elliptical resampling filter under the same conditions. Clearly, the prior art filters cannot handle all conditions successfully.

As shown in the column 701, the size and shape of the reconstruction kernels are dominated by the low-pass filter 712 when a mapping from the camera space to the ray space minifies the volume.

As shown in the column 702, the reconstruction kernels are dominated by the basis function when the volume is magnified. Because our reconstruction kernel 713 combines the basis function 711 with the low-pass filter function, a smooth transition between magnification and minification is enabled.

As shown in the column 703, our reconstruction kernel scales well anisotropically when the samples are minified in one direction and magnified in another direction.

Row 714 shows the prior art resampling filter that is uniformly scaled to avoid aliasing. There, the reconstruction kernel is essentially enlarged so that the minor radius is at least as long as the minor radius of the low-pass filter. For elliptical footprint functions, uniform scaling yields overly blurred images in the direction of the major axis of the ellipse.

Figures 8A, 8B:
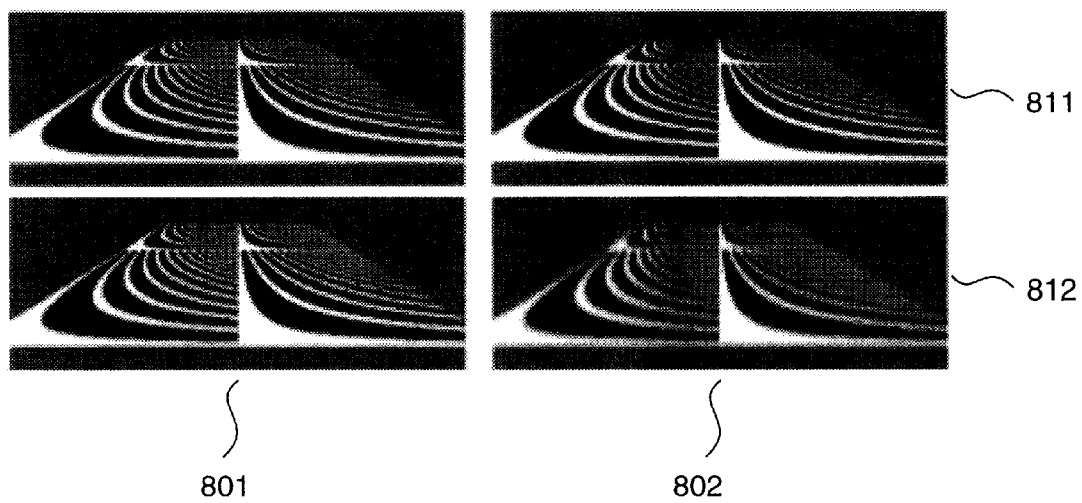
FIGS. 8a–b are images of prior art splatting and splatting according to the invention.

FIG. 8a shows images 801 rendered with the reconstruction kernel according to the invention. FIG. 8b shows images 802 rendered with prior art uniformly scaled resampling filter. A square zebra texture with x and y dimensions of 1024×512×3 pixels is shown in row 811, 1024×256×3 in row 812. This leads respectively to elliptical kernels with a ratio between the length of the major and minor radii of 2:1, and 4:1.

Clearly, our continuous reconstruction kernel produces crisper images without the annoying aliasing artifacts present in the prior art images. As the ratio between the major and minor radii of the reconstruction kernels increases, the difference between our method and the prior art method becomes more pronounced. For strongly anisotropic kernels, prior art uniform scaling produces excessively blurred images, as shown in the images of FIG. 8b.

Figure 9:
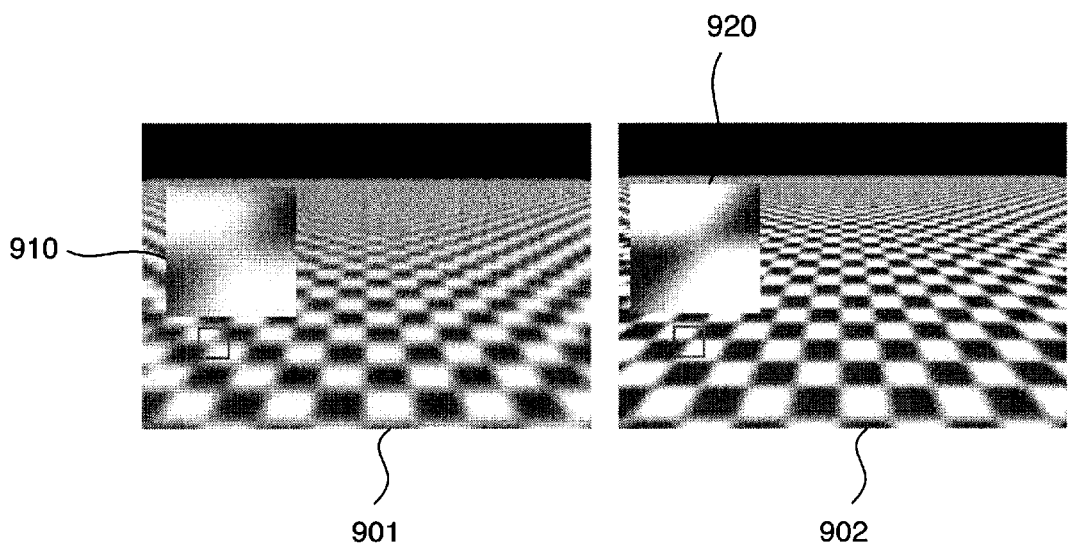
FIG. 9 is images of volume and surface splatting.

In FIG. 9, we show an image 901 rendered by a 3D "volume" reconstruction kernels, and a 2D "surface" reconstruction kernel. The texture size is 512×512 in the x and y directions. Typically, the perspective projection of the spherical kernel is almost a circle. Therefore, rendering with volume kernels does not exhibit anisotropic texture filtering and produces textures that are blurry, see magnified inset 910, similar to isotropic texture filters such as trilinear mip-mapping. On the other hand, splatting surface kernels is equivalent to EWA texture filtering. Circular surface kernels are mapped to ellipses, which results in high image quality because of anisotropic filtering, see inset 920.

Implementation Details

Figure 10:
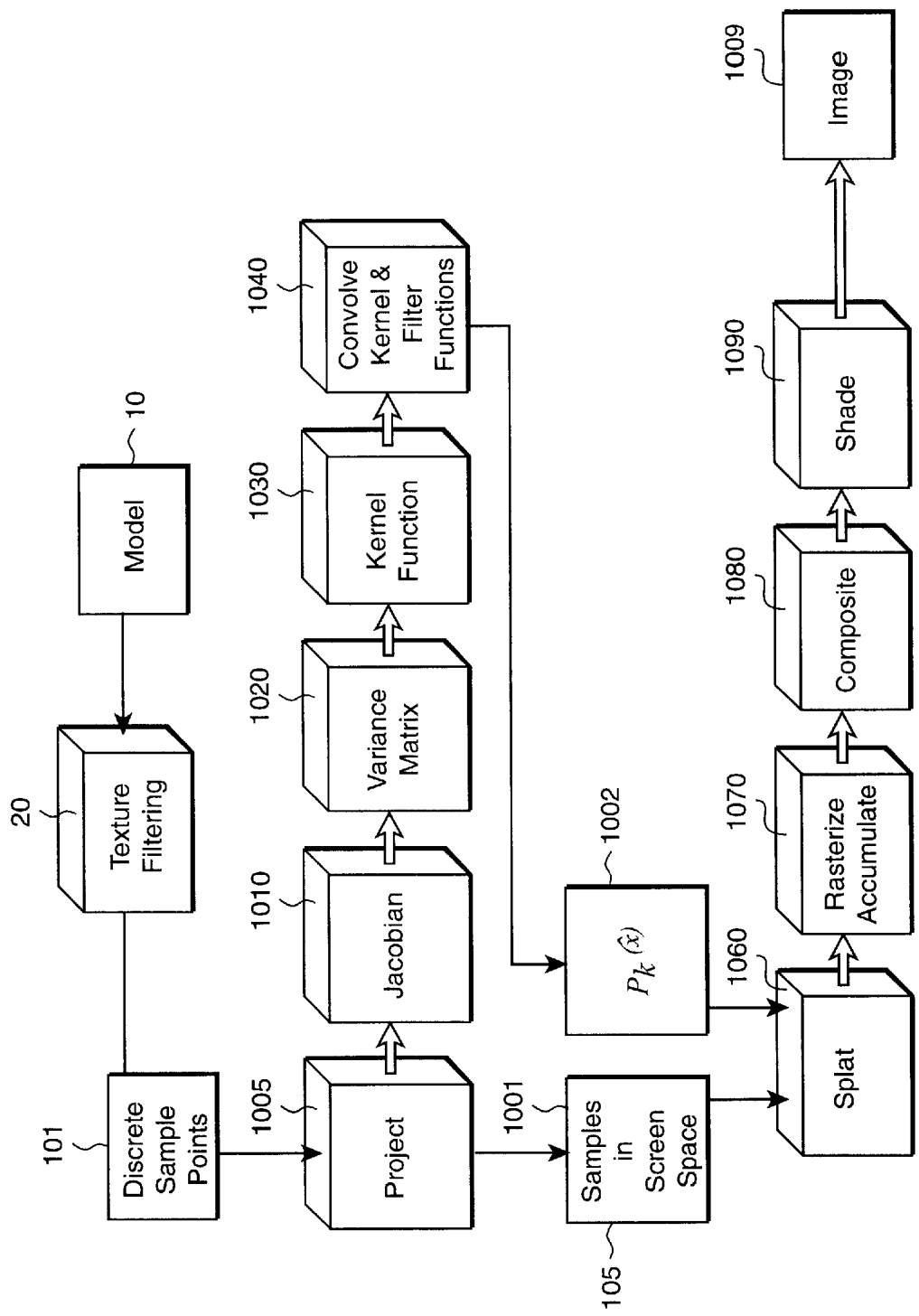
FIG. 10 is a block diagram of steps for producing a continuous image from a set of discrete sample points according to the invention.

As shown in FIG. 10, we produce a continuous image from a set of discrete sample points 101 as follows. First, we project 1005 each sample point $P_k$ to its position $m(u_k)$ in screen space. For each discrete sample point we generate a corresponding continuous reconstruction kernel 1002 by first determining 1010 the Jacobian (J) as in Equation (24). Then, we determine 1020 a variance matrix (V) for each reconstruction kernel in ray space 103 according to Equation (19). Next, we integrate 1030 the reconstruction kernels according to Equation (20) to produce the basis functions $q_k(\hat{x})$. We convolve 1040 the basis functions with low-pass filters h as in Equation (21) to produce a continuous reconstruction kernels $\rho_k(\hat{x})$ 1002 for each discrete sample point in screen space 105.

The reconstruction kernel is centered at $m(u_k)$, and is evaluated for each sample point by applying (splat 1060) each reconstruction kernels to its corresponding discrete sample points projected into screen space to yield continuous samples of the continuous image.

Because the pixel grid in screen space is regular, the reconstruction kernel can be evaluated efficiently by rasterization 1070. Effectively, splatting is a rasterization of the resampling kernels. The rasterizing can use forward differencing in a rectangular bounding box, and using 1D generic look-up tables. In general, the depth complexity of a scene is greater than one, thus a process is required to separate the contributions of different surfaces when the surfaces are splatted into sheet buffers. Consequently, the z value of the tangent plane at $P_k$ is determined at each pixel that is covered by the kernel. This can be done by forward differencing as well.

As we rasterize the kernels, we accumulate the rasterized pixels in sheet buffers. The sheet buffers correspond to planes in the set of sample points that are most parallel to the projection plane. To determine whether a new contribution belongs to the same surface that is already stored for a pixel, the difference between the new value and the z value stored in the frame buffer is compared to a predetermined threshold. If the difference is smaller than the threshold, the contribution is added to the pixel. Otherwise, given that it is closer to the viewpoint, the data of the sheet buffer is replaced by the new contribution. The sheet buffers are composited 1080 in a back-to-front order into a frame buffer.

We prefer to use deferred shading by shading after all sample points of a scene have been splatted. This avoids shading invisible sample points. Instead, each pixel is shaded using gradient estimation to determine filtered surface normals. Parameters for the shader are accessed via an index to a table with material properties, see Table A above. Advanced pixel shading methods, such as mapping, can be implemented as well.

Additionally, the well known Phong illumination model can be applied to produce the output image 1009. Note, shading can also be done prior to splatting. It is common for real-time applications to implement rendering processes as hardware pipelines, perhaps as a single chip, see U.S. Pat. No. 6,008,813 "Real-Time PC Based Volume Rendering System." Therefore, we prefer that the means that implement the functional blocks of FIG. 10 be hardware based for real-time applications.

As described above, an optional pre-processing step 20 can perform texture filtering by acquiring texture from a model 10, e.g., a polygon model, and convert the model 10 to the discrete point-sampled model 101.

Effect of the Invention

We have described a new splat primitive for volume and point-sample surface rendering. We call this primitive an elliptical weighted average EWA continuous resampling filter. Our primitive provides high quality anti-aliasing for splatting methods. The method described above combines an elliptical Gaussian reconstruction kernel with a Gaussian low-pass filter. We use a novel approach for determining the resampling kernel. Exploiting the features of 2D and 3D Gaussian reconstruction kernels, our method efficiently handles arbitrary elliptical reconstruction kernels, and perspective projection. Therefore, our splat primitive is well suited for rendering regular, rectilinear, curvilinear, and irregular volume and point-sample data sets.

To achieve interactive frame rates, a graphics hardware rendering engine can be used to rasterize our EWA splats as texture mapped polygons. We can also use sheet-buffers that are parallel to the image plane to eliminate "popping" artifacts. To render non-rectilinear data sets, a back-to-front sorting process can be applies prior to rendering. Furthermore, our splat primitive can be used in a post-shaded volume rendering pipeline. The derivative of our EWA reconstruction kernel can also be used as a band-limited gradient kernel. Consequently, aliasing caused by the shading for noisy volume data is avoided. In conjunction with culling processes, our method is also useful for real-time iso-surface rendering. The volume splatting method according to the invention can also be applied to volumetric models, such as clouds, fire, and 3D medical scans.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for producing an image from a set of discrete sample points, comprising:

projecting each discrete sample point to a screen space;

generating a continuous resampling filter for each sample point in screen space, the continuous resampling filter being a combination of a continuous reconstruction function and a continuous filter function for the sample point in screen space;

applying the continuous resampling filter to each corresponding discrete sample in the screen space to generate the image.

2. The method of claim 1 wherein each discrete sample point is defined in an object space, and the projecting further comprises:

transforming each sample point from object space to a view independent camera space;

transforming each sample point from the camera space to a ray space; and transforming each sample point from the ray space to the screen space.

3. The method claim 1 wherein the continuous resampling filter is a combination of elliptical weighted average Gaussian functions.

4. The method of claim 1 wherein the set of sample points is a volume data set.

5. The method of claim 1 wherein the set of sample points is a point-sampled surface.

6. The method of claim 1 wherein the set of sample points is a surface inside a volume.

7. The method of claim 1 further comprising:

texture filtering the sample points in object space.

8. The method of claim 1 further comprising:

rasterizing each continuous resampling filter to generate discrete pixels of the image.

9. The method of claim 8 further comprising:

accumulating the discrete pixels in a buffer; and shading the accumulated pixels.

10. The method of claim 1 wherein the continuous filter function is a low-pass filter function for band-pass filtering the projection of the continuous reconstruction kernels to anti-alias a rasterized image.

11. The method of claim 1 wherein the continuous reconstruction function and the continuous filter function are each in the form of an elliptical Gaussian function.

12. The method of claim 1 wherein the continuous resampling function is non-uniformly scaled during minification and magnification.

13. The method of claim 11 wherein the continuous reconstruction kernel is three-dimensional in object space for volume reconstruction, and two-dimensional for surface reconstruction.

14. The method of claim 11 wherein the continuous resampling filter is a Gaussian function.

15. The method of claim 7 wherein the texture mapping uses a texture reconstruction kernel in the form of a Gaussian function, and further comprising:

mapping the reconstruction kernel from the object space to a texture space for each sample point;

evaluating the reconstruction kernel in the texture space to determine a color; and assigning the color to the sample point in object space.

16. The method of claim 1 further comprising:

storing pixel fragments in multiple sheet buffers during the rasterizing;

compositing the sheet buffer in a back-to-front order to produce final pixel colors of transparent sample points.

17. The method of claim 1 further comprising:

multiplying an alpha value of each pixel fragment with a coverage coefficient to enable edge anti-aliasing of the image.

18. A system for producing an image from a set of discrete sample points, comprising:

means for projecting each discrete sample point to a screen space;

means for generating a continuous resampling filter for each sample point in screen space, the continuous resampling filter being a combination of a continuous reconstruction function and a continuous filter function for the sample point in screen space; and means for applying the continuous resampling filter to each corresponding discrete sample in the screen space to generate the image.

* * * * *